United States Patent
Lepauloux et al.

(10) Patent No.: US 10,115,399 B2
(45) Date of Patent: Oct. 30, 2018

(54) AUDIO CLASSIFIER THAT INCLUDES ANALOG SIGNAL VOICE ACTIVITY DETECTION AND DIGITAL SIGNAL VOICE ACTIVITY DETECTION

(71) Applicant: NXP B.V., Eindhoven (NL)

(72) Inventors: Ludovick Dominique Joel Lepauloux, Cannes (FR); Laurent Le Faucheur, Antibes (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/215,259

(22) Filed: Jul. 20, 2016

(65) Prior Publication Data
US 2018/0025732 A1 Jan. 25, 2018

(51) Int. Cl.
G10L 25/78 (2013.01)
G10L 17/22 (2013.01)
G10L 25/84 (2013.01)
G10L 25/51 (2013.01)
G10L 25/81 (2013.01)
G10L 25/93 (2013.01)
G10L 25/09 (2013.01)

(52) U.S. Cl.
CPC .......... G10L 17/22 (2013.01); G10L 25/51 (2013.01); G10L 25/81 (2013.01); G10L 25/84 (2013.01); G10L 25/09 (2013.01); G10L 2025/937 (2013.01)

(58) Field of Classification Search
None
See application file for complete search history.

(56) References Cited

U.S. PATENT DOCUMENTS

| | | | | |
|---|---|---|---|---|
| 5,278,944 A | * | 1/1994 | Sasaki | G10L 19/02 704/211 |
| 5,983,186 A | * | 11/1999 | Miyazawa | G10L 15/26 704/233 |
| 6,070,140 A | * | 5/2000 | Tran | G06F 1/3203 704/232 |
| 6,556,967 B1 | * | 4/2003 | Nelson | G10L 25/78 704/208 |
| 2012/0022864 A1 | * | 1/2012 | Leman | G10L 25/00 704/233 |
| 2012/0155655 A1 | * | 6/2012 | Parkhomenko | H04R 3/00 381/56 |
| 2012/0278068 A1 | * | 11/2012 | Wang | G10L 25/78 704/210 |
| 2014/0012573 A1 | * | 1/2014 | Hung | G06F 1/3215 704/233 |
| 2014/0122078 A1 | * | 5/2014 | Joshi | G06F 1/324 704/251 |

(Continued)

OTHER PUBLICATIONS

Lerch, A., An introduction to audio content analysis: Applications in signal processing and music informatics, Wiley & Sons, 2012.*

(Continued)

*Primary Examiner* — Jialong He (57) ABSTRACT

The disclosure relates to an audio classifier comprising: a first processor having hard-wired logic configured to receive an audio signal and detect audio activity from the audio signal; and a second processor having reconfigurable logic configured to classify the audio signal as a type of audio signal in response to the first processor detecting audio activity.

14 Claims, 9 Drawing Sheets

(56) References Cited

U.S. PATENT DOCUMENTS

| | | | | |
|---|---|---|---|---|
| 2014/0278435 A1* | 9/2014 | Ganong, III | ............ | G10L 15/22 704/275 |
| 2014/0297287 A1* | 10/2014 | Newman | ................ | G10L 15/08 704/275 |
| 2014/0343949 A1* | 11/2014 | Huang | .................... | H04R 1/08 704/275 |
| 2014/0348345 A1* | 11/2014 | Furst | ....................... | H04R 3/00 381/111 |
| 2015/0066498 A1* | 3/2015 | Ma | ......................... | G10L 15/28 704/233 |
| 2015/0110263 A1* | 4/2015 | Johnston | ............. | H04R 1/1041 379/430 |
| 2015/0112690 A1* | 4/2015 | Guha | ................... | G06F 1/3203 704/275 |
| 2015/0332667 A1* | 11/2015 | Mason | ................... | G10L 15/02 704/249 |
| 2016/0171976 A1* | 6/2016 | Sun | ................... | H04W 52/0251 704/233 |
| 2016/0232899 A1* | 8/2016 | Chen | ...................... | G10L 15/22 |

OTHER PUBLICATIONS

Extended European Search Report for application No. 15290195.5 (dated Nov. 18, 2015).

Google Blog; "OMG! Mobile Voice Survey Reveals Teens Love to Talk"; retrieved from the internet Jul. 14, 2016; 7 pages (Oct. 14, 2014).

Moattar, M.H. et al; "A Simple but Efficient Real-Time Voice Activity Detection Algorithm"; 17th European Signal Processing Conference, Glasgow, Scotland; 5 pages (Aug. 24-28, 2009).

Poh, Michael; "5 Key Features to Expect in Future Smartphones"; retrieved from the internet http://www.hongkiat.com/blog/future-smartphone-features/ on Jul. 14, 2016; Hongkiat; 7 pages.

\* cited by examiner

On-day use-case

⬚ SILENT    ╱ NOISY    ⊠ VOICE

FIG. 9a

⬚ HW VAD=0.17mW    ╱ FW ENV=0.85mW    ⊠ FW VAD=1mW    ╲ AP

AUDIO CLASSIFIER THAT INCLUDES ANALOG SIGNAL VOICE ACTIVITY DETECTION AND DIGITAL SIGNAL VOICE ACTIVITY DETECTION

CROSS-REFERENCE TO RELATED APPLICATIONS

This application claims the priority under 35 U.S.C. § 119 of European patent application no. 15290195.5, filed Jul. 28, 2015 the contents of which are incorporated by reference herein.

FIELD OF THE INVENTION

This disclosure relates to the field of audio classifiers and audio classification. In particular, although not exclusively, this disclosure relates to voice recognition systems that include an audio classifier.

BACKGROUND

Voice control is an important area of research and development for a variety of computing device applications, such as for the implementation of voice recognition functions in mobile telecommunication devices. Early voice recognition systems attempted to recognise voice commands by analysis of sound wave envelopes, and the like. More recent developments in voice recognition include systems that interpret diction and syntax in a similar way to how humans recognise speech. Such voice recognition systems have proved to be a more accurate and effective mechanism for providing a natural language user interface.

A difficulty encountered in many voice recognition systems is that the voice recognition functionality exert significant demands on the processing capability and power consumption of a device when in use. These demands may be problematic for mobile computing devices in which processing power and battery capacity are typically constrained. For some applications, it is desirable that voice recognition is provided in an "always-on" mode in order to provide an improved user experience. However, the problems associated with the demands of voice recognition systems are exacerbated by providing voice recognition functionality continuously.

Options for reducing the processing overheads and power consumption of voice recognition systems include implementing a keyword detector, in which voice recognition is only initiated when a specific keyword is detected, or requiring a user to press a button before interaction. However, these solutions require the user to modify their behaviour in order to initiate voice recognition and so disrupt the user experience.

Speaker authentication systems suffer from the same problems a voice recognition systems because they may also require significant processing capability, which is why they may be mainly supported by an application processor (AP), which are typically included in high-end devices using a 10 to 20 MHz microcontroller with an ARM architecture, for example.

SUMMARY

According to a first aspect of the disclosure there is provided an audio classifier comprising: a first processor having hard-wired logic configured to receive an audio signal and detect audio activity from the audio signal; and a second processor having reconfigurable logic configured to classify the audio signal as a type of audio signal in response to the first processor detecting audio activity.

The present disclosure enables audio activity to be classified in a computationally efficient and power efficient manner. The classification may be provided as a trigger for an audio recognition system, instead of the use of a keyword or a user pressing a button for example, and so enable an improved method of activating the audio recognition system.

The reconfigurable logic of the second processor may be configured to perform the classification in conjunction with software or firmware. The second processor may have a first stage. The second processor may have a second stage. The first stage of the second processor may be provided by a separate processing unit to the second stage of the second processor. The first stage of the second processing unit may be configured to perform the classification in conjunction with firmware. The second stage of the second processing unit may be configured to perform the classification in conjunction with software.

The reconfigurable logic of the second processor may be a voice activity detector. The second stage of the second processing unit may be a voice activity detector. The reconfigurable logic of the second processor may be configured to classify the audio as either speech or not speech.

The hard-wired logic of the first processor may be configured to provide one or more metrics associated with the audio signal to the second processor. The metrics may include an average back ground level of the audio signal over an interval of time. The hard-wired logic of the first processor may be configured to determine an energy of the audio signal in order to detect audio activity. The hard-wired logic of the first processor may be configured to operate on analogue audio signals.

The second processor may comprise an analogue-to-digital converter configured to digitise the analogue audio signal. The first stage of the second processor may comprise an analogue-to-digital converter configured to digitise the analogue audio signal. The second processor may be a mixed-signal processor. The reconfigurable logic may be configured to classify a digitised audio signal.

The reconfigurable logic of the second processor may be configured to determine one or more features of the audio signal and classify the audio signal in accordance with the one or more features. The second stage of the second processor may be configured to determine one or more features of the audio signal and classify the audio signal in accordance with the one or more features. The one or more features may exclusively comprise: tonal power ratio; short term energy; crest factor; and zero crossing rate.

The first stage of the second processor may be configured to provide one or more metrics associated with the audio signal to the second stage of the second processor. The one or more metrics may include an average background level of the audio signal over an interval of time. The first processor may be configured to determine an energy of the audio signal in order to detect audio activity. The first processor may be configured to operate on an analogue audio signal.

An audio classifier is also disclosed that comprises a processor having hard-wired logic configured to receive an audio signal and detect audio activity from the audio signal. The audio classifier may further comprises any of the features disclosed herein.

According to a further aspect there is provided an audio recognition system comprising:

an audio classifier; and an audio recognition unit configured to determine one or more audio segments from the audio signal in response to the second processor classifying the audio as a particular type of audio signal.

The audio recognition system may be a voice recognition system. The audio recognition unit may be a voice recognition unit configured to determine one or more words from the audio signal in response to the second processor classifying the audio signal as a voice signal. The audio recognition system may be a music recognition system. The audio recognition unit may be a music recognition unit configured to determine the identity of a piece of music from the audio signal in response to the second processor classifying the audio signal as music.

According to a further aspect there is provided a mobile computing device comprising the voice recognition system or audio classifier.

BRIEF DESCRIPTION OF THE DRAWINGS

One or more embodiments of the disclosure will now be described, by way of example only, and with reference to the accompanying figures in which.

DETAILED DESCRIPTION

Figure 1:
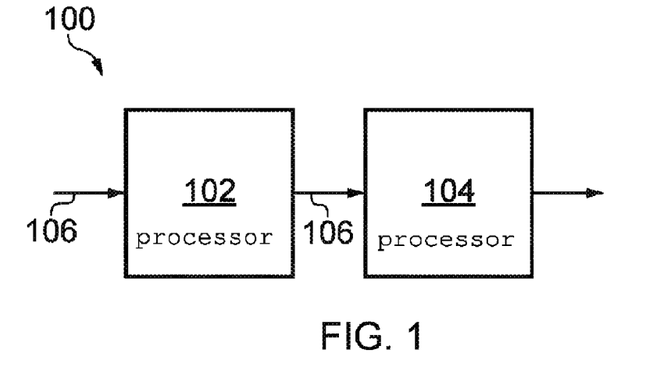
FIG. 1 shows a block diagram for an audio classifier.

FIG. 1 illustrates a schematic representation of an audio classifier 100. The audio classifier 100 comprises a first processor 102 and a second processor 104. The first processor has hard-wired logic configured to receive an audio signal 106 and detect audio activity from the audio signal 106. The hard-wired logic is provided by a specific circuit arrangement. The second processor 104 has reconfigurable logic configured to provide a classification of the audio signal as a type of audio signal in response to the first processor detecting audio activity. The reconfigurable logic may be set based on software or firm ware instructions. The first processor provides a rough guide whether a useful audio signal is present with low power consumption. The second processor confirms the presence of audio activity which may be at the cost of a higher power consumption. The audio classifier 100 may therefore be considered to provide a low-power activation codec.

The audio classifier 100 may be provided as a front end for an audio recognition system, such as speech/speaker recognition, speaker authentication or voice command, in order to reduce the power consumption of the system as a whole by only feeding an audio recognition system with useful audio frames. A useful audio frame may be provided by an audio segment that looks like a speech signal, in the case of voice recognition, and any other kind of signal (background noise including background speech signal) may be filtered out. Such a codec enables a computational and power efficient "always on" listening mode on a smart phone, tablet or wearables without constraining the user to interact with its mobile device by pressing a button, for instance.

Figure 2:
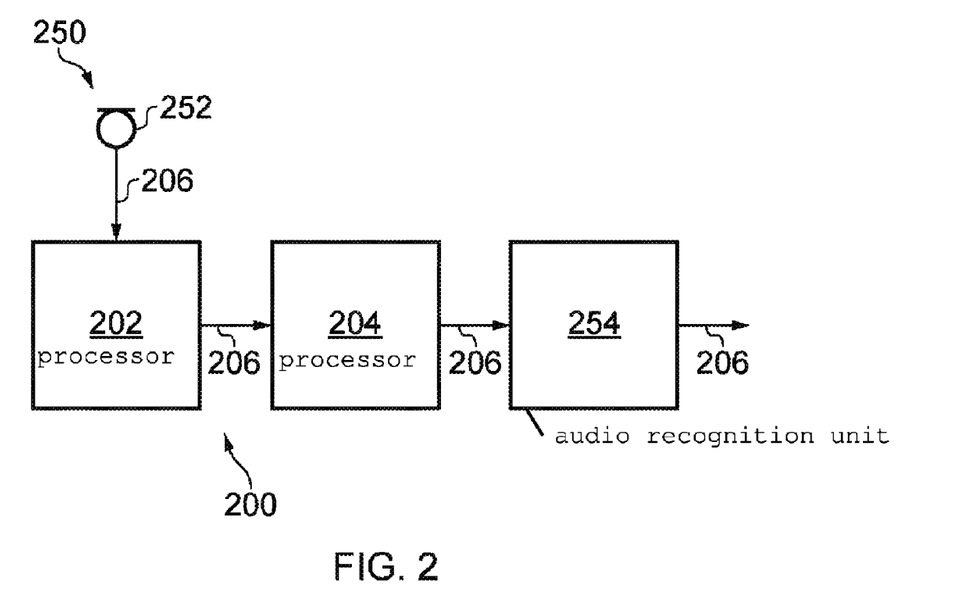
FIG. 2 shows a block diagram for an audio recognition system.

FIG. 2 shows a schematic of an audio recognition system 250 for a mobile computing device. The audio recognition system 250 comprises a microphone 252, an audio classifier 200 similar to that described with reference to FIG. 1 and an audio recognition unit 254. The audio recognition unit 254 is configured to determine one or more audio segments from the audio signal 206 in response to the second processor 204 of the audio classifier 200 classifying the audio signal 206 as a particular type of audio signal.

For example, the audio recognition system 250 may provide a voice recognition system. In the voice recognition system, the reconfigurable logic of the second processor 204 provides a voice activity detector with the reconfigurable logic of the second processor 204 configured to classify the audio signal 206 as either speech or not speech. The audio recognition unit 254 provides a voice recognition unit configured to determine one or more words from the audio signal 206 in response to the second processor 204 classifying the audio signal 206 as a voice signal. Alternatively, the audio segments may be segments of music, for example.

The audio classifier 200 may be provided as an independent unit that is separable from the speech recognition system. As such, the audio classifier may be combined with an existing speech/speaker recognition engine in order to improve its efficiency. The implementation of the audio classifier does not necessarily take into account the technology/type of algorithms used by the recognition engine of the speech recognition system, and so may be provided with a variety of different types of audio recognition system. However, a specific implementation of the audio classifier may be adapted to work with a specific recognition engine in order to improve the overall performance. For instance, some voice recognition systems have their own voice detector that is driven by the recognition engine in order to avoid missing part of the useful speech. The audio classifier may therefore be configured based on a priori information related to the specific implementation of the audio recognition engine with which it is intended to be used in order to make use of information computed by the recognition engine. For example, some audio recognition engines may send a "recognition pending" signal to the audio classifier in order to force it to classify an incoming signal as a speech segment. In other words, such an audio recognition engine drives the audio classifier so that it stays active and feeds the recognition engine with the microphone signal.

Figure 3:
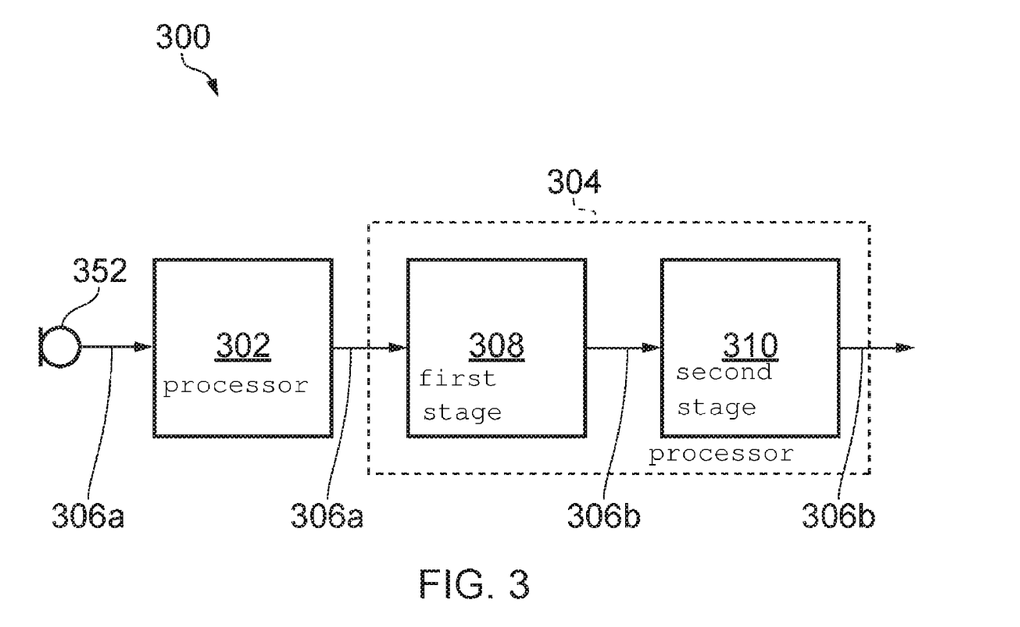
FIG. 3 shows a block diagram for another audio classifier.

FIG. 3 illustrates a schematic representation of another audio classifier 300. The audio classifier 300 comprises a first processor 302, a second processor 304 and a microphone 352 for providing an analogue audio signal 306a.

The first processor is similar to that described previously with reference to FIGS. 1 and 2. The first processor has hard-wired logic configured to receive an analogue audio signal 306a and detect audio activity from the analogue audio signal 306a by determining an energy of the analogue audio signal in order to detect audio activity for computing long-term (larger than a second, or several seconds) estimates of the noise background shape.

The reconfigurable logic of the second processor 304 in this example has a first stage and a second stage. Each stage may be provided by a different co-processor. The first stage is configured to interpret firmware instructions 308 and the second stage is configured to interpret software 310. In this way, the second processor 304 performs the classification in conjunction with firmware instructions 308 and software instructions 310. Alternatively, the second processor could be configured to perform the classification using software instructions only.

An analogue-to-digital converter is provided by the second processor 304 acting on firmware instructions 308. Alternatively, the analogue to digital converter may be provided by the hardware of the first processor 302. The analogue-to-digital converter is configured to digitise the analogue audio signal 306a and provide a digital audio signal 306b.

The reconfigurable logic of the second processor 304 is configured to determine one or more features of the digital audio signal 306b using the software instructions 310 and to classify the digitised audio signal 306b in accordance with the one or more features. The one or more features may exclusively comprise: tonal power ratio; short term energy; crest factor; and zero crossing rate.

Accordingly, the proposed solution is split into two stages, a first stage, analogue processor 302 and a second stage, digital processor 304. The first stage has a lower complexity and power consumption when in use than the second processor 304.

Figure 4:
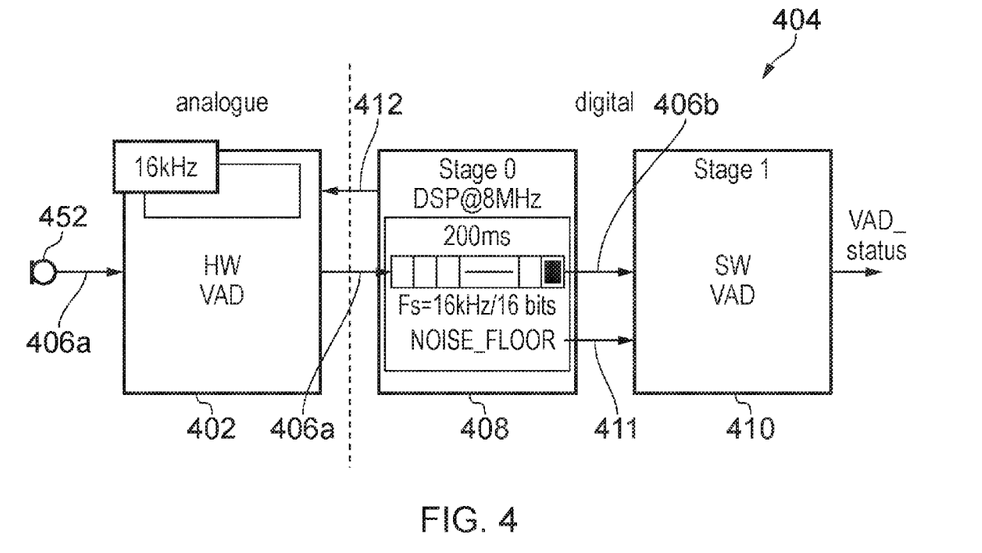
FIG. 4 shows a block diagram for a further audio classifier.

FIG. 4 illustrates in further detail a block diagram of another audio classifier 400 that is similar to that described previously with reference to FIG. 3. The audio classifier 400 may provide an efficient low-power activation codec with an analogue-to-digital (A/D) converter architecture (low-voltage) and low-complexity voice activity detector (VAD) coprocessor.

The principles under which the audio classifier 400 operates are as follows:

1. The analogue audio signal 406a picked-up by the microphone 452 is monitored by a hardware detector of the first processor 402 which performs envelope detection at low sampling rate, of 16 kHz for example.
2. Once a level change is detected in the audio signal 406a by the first processor 402, an audio sampling rate of the second processor 404 is changed to deliver a higher signal to noise ratio. A FIFO buffer is operated using firmware instructions to buffer the next samples up to 300 ms or between 200 and 300 ms. In this example, the FIFO buffer has a sampling rate of 16 kHz and a resolution of 16 bits, and is implement by digital signal processor operating at 8 MHz. The firmware front-end:
   a. buffers the 16 kHz audio samples over a 200 ms analysis window
   b. confirms that the energy of the signal is significant (above an energy threshold) over the analysis window using envelope detection by filtering the energy of the input signal with different time constants in the range of 1 ms to 100 ms. Differences between short-term and long-term estimators are integrated over the period of the analysis window in order to decide is made to reject the audio buffer or to continue with software VAD and its spectral analysis.
   c. adjust gain and detection thresholds 412 of the energy detector provided by the hardware coprocessor, or first processor 402. In this way, the second processor 404 is configured to provide one or more metrics 412 associated with the analogue audio signal 406a to the first processor 402.
3. A voice activity detector is provided by software instructions 410 of the second processor 404 in order to re-process the 200 ms buffer and confirm a presence or absence of audio activity, such as speech. The voice activity detector is able to make use of an estimate of the background noise 411 computed by the second processor 404 using firmware instructions 408.

The efficiency savings provided by some implementations of the audio classifier may be achieved based on typical daily use of mobile devices by teenagers and adults. A threshold at which the first processor takes audio activity may be set in accordance with the profile of a user, or class of user, in order to improve the efficiency and output accuracy of the audio classifier.

Figure 5:
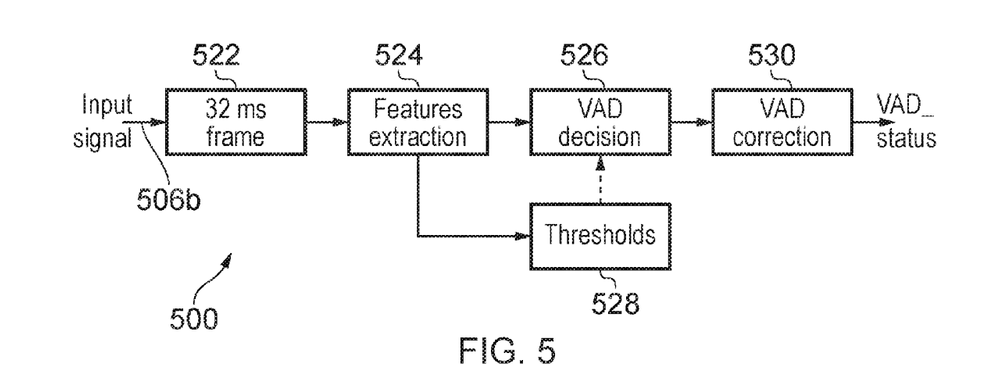
FIG. 5 shows a block diagram for the process is performed by a second processor of the audio classifier, such as that described with reference to FIG. 4, using software.

FIG. 5 shows a block diagram of an example voice activity detector (VAD) 500 provided by the software instructions of the second processor. An example algorithm for the VAD 500 is provided below using Matlab notation.

```
global NOISE
global VOICE
% Compute number of subframes
Nf = FrameSize; % 16ms
NFFT = FftSize; % 256
Num_of_Frames = WinSize / FrameSize; % WinSize = 32ms
for idx = 0 : Num_of_Frames−1
    % Get one input subframe
    ist = idx*Nf + 1;              % New data starts
    ifn = ist + Nf − 1;            % New data limits
    subFrame = FrameMicIn(ist:ifn);
    % Compute short-term features
    % Short-term energy
    nrjST = mean(abs(subFrame)); % Save MIPS-Instead of nrjST = sum(subFrame.^2,1);
    % Set decision threshold for short-term energy, spectral crest and
    % tonal power ratio
    if nrjST > Threshold + mean(NrjEst) % To switch between near field
and far field mode
        Thresh_E = NrjThreshNF;
        Thresh_Crest = SCThresh;
        Thresh_TPR = TPRThreshNF;
    else
        Thresh_E = NrjThreshFF;
        Thresh_Crest = SCThresh;
        Thresh_TPR = TPRThreshFF;
    end
    % Spectral crest factor
    X = (1/Nf).*fft(subFrame, NFFT);
    SpecMag = abs(X(1:NFFT/2+1);
    indexes = (StartIdxSC : 1 : StopIdxSC); % From 2.4kHz to 8kHz
    Crest = 10*FeatureSpectralCrest(SpecMag(indexes));
    % Tonal power ratio
    TPR = FeatureSpectralTonalPowerRatio(SpecMag, Thresh_TPR);
    % Multi-boundary decision
    Counter = 0;
    if nrjST > Thresh_E
        Counter = Counter + 1;
    end
    if Crest > Thresh_Crest
        Counter = Counter + 1 ;
    end
    if TPR ~= 0
        Counter = Counter + 1;
    end
    % Vote for voice activity decision / Classification
    if Counter >= 2
        marker = VOICE;
    else
        marker = NOISE;
    end
    PrevMarkers = [PrevMarkers(2:end), marker];
end
%> Voice activity decision - hang-over
```

```
if sum(PrevMarkers(1:10)) == 0
    marker = NOISE;
elseif sum(PrevMarkers(7:8)) == 2 && sum(PrevMarkers(9:10)) == 0 &&
Counter == 0%
Avoid oscillation which occurs when subframe decision decides noise and
hangover decides speech
    marker = NOISE;
elseif sum(PrevMarkers(7:8)) == 2 && sum(PrevMarkers(9:10)) >= 1
    marker = VOICE;
elseif sum(PrevMarkers(1:10)) >= ActiveSpeechRatio % Ignore speech run
less than ActiveSpeechRatio successive frames
    marker = VOICE;
else
    marker = NOISE;
end
% Release time control
if marker == VOICE
    Release = Release;
    VAD_status = marker;
end
if marker == NOISE
    if (Release > 0)
        Release = Release − 1;
        VAD_status = VOICE;
    else
        VAD_status = marker;
    end
end
```

The VAD 500 starts by splitting 522 the digital audio signal 506b into frames of 32 ms (at 16 kHz) with no analysis window and no overlap.

The VAD 500 extracts 524 one or more measured features from each frame. Preferably, at least 3 features are extracted in order to provide a suitably robust classification. The accuracy of the classification increases in accordance with a number of features used. However, the computational complexity of the voice activity detector also increases in accordance with the number of features used.

For each incoming frame, three short-term features are computed on sub-frame of 16 ms. Features that have been found to be particularly advantageous with respect to different noise conditions, and also to limit software complexity, are:

1. short-term energy: used for speech/silence detection. However, this feature loses its efficiency in noisy conditions especially in lower signal-to-noise ratio conditions. Short-term energy is a simple short-time measurement of the energy E computed for each frame t of signal.

$$E_t = \sum_{n=1}^{L} x[n]^2$$

where L is the frame size comprising samples n. Here, for the sake of reducing complexity, no analysis window is applied on the microphone signal x, and there is no overlap between consecutive frames.

2. spectral crest factor is a good feature for voiced/unvoiced/silence detection. This feature may be computed over a limited frequency range and not on the full spectrum of the input signal. The spectral crest factor may be calculated from the short time Fourier transform (STFT) and is calculated for every short-time frame of sound. Spectral crest factor is the ratio of peak magnitude of the STFT to the sum of the STFT magnitudes $$C_t = \frac{\max_{n \in B_{k0}} \{M_t[n]\}}{\sum_{n=1}^{N} M_t[n]}$$

where $M_t[n]$ is the magnitude of the Fourier transform at frame t and frequency bin n.

3. tonal power ratio: it has been found to be a really discriminative feature in addition to the two previous features. The tonal power ratio is obtained by computing the ratio of the power of tonal components k to the overall power of all components n. The estimation of the power of the tonal components can be done by keeping only the frequency components of the STFT having their square magnitudes above a threshold $G_T$.

$$TPR_t = \frac{\sum_{k \in V} |M_t[k]|^2}{\sum_{n=1}^{N} |M_t[n]|^2}$$

where V={k, $|M_t[k]|^2 > G_T$}
and, optionally:

4. zero crossing rate: the rate at which the time domain audio signal changes between positive and negative. The zero crossing rate can be computed using the following formula:

$$Z_t = \frac{1}{2} \sum_{n=1}^{N} |\text{sign}(x[n]) - \text{sign}(x[n-1])|$$

Typically, although the spectral crest factor and the tonal power ratio provide complementary information, the computation of these features is based on common quantities and so the computational effort in determining the two features may be reduced by making use of the common quantities.

The combination of the above four features (short-term energy, spectral crest factor, tonal power ratio, zero crossing ratio) has been found to be advantageous for a variety of day-to-day activities and may provide an acceptable trade-off between power consumption and classification accuracy. An example of combining features to provide a "multi-boundary decision" is described below with reference to FIGS. 6a to 6d.

FIGS. 6a to 6d illustrates example spectra of the above features 1 to 3 associated with an audio signal 600 recorded in a shopping centre at 12 dB SNR.

Figure 6A:
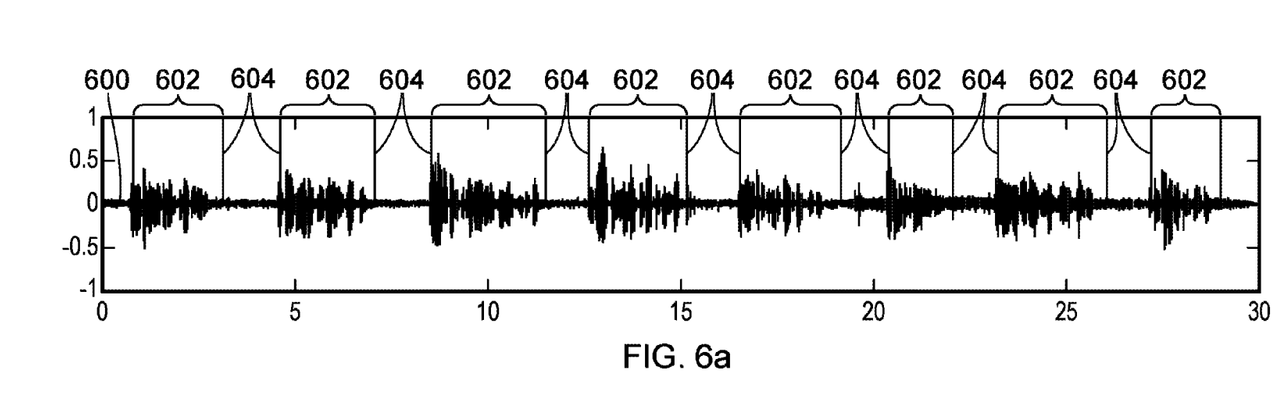
FIGS. 6a to 6d illustrate features of an audio signal.

FIG. 6a illustrates a normalised amplitude of the audio signal 600 against time. The audio signal 600 has periods of speech 602 separated by periods of quiet (not speech) 604.

Figure 6B:
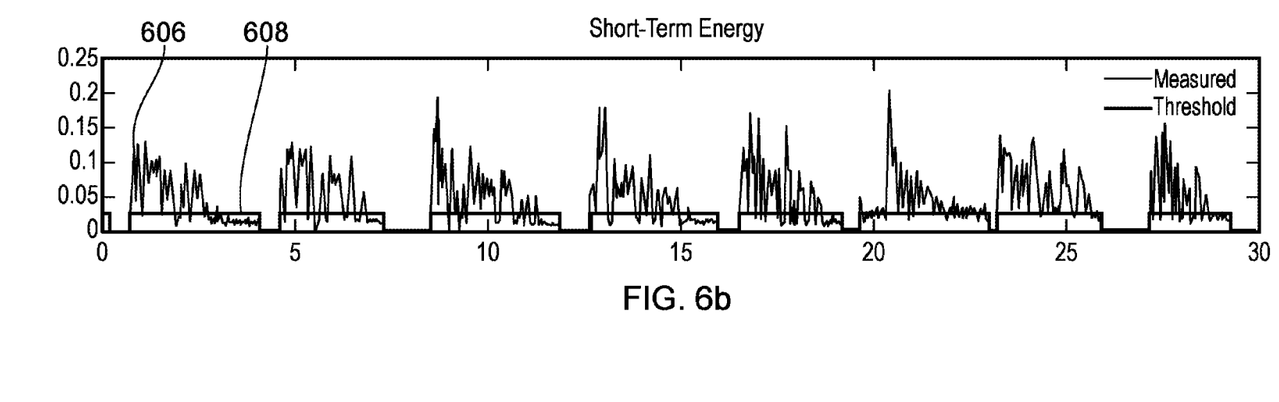

FIG. 6b illustrates the short-term energy 606 of the audio signal 600 as a function of time. A short-term energy threshold 608 for classifying the periods of speech 602 and not speech 604 is also shown in FIG. 6b.

Figure 6C:
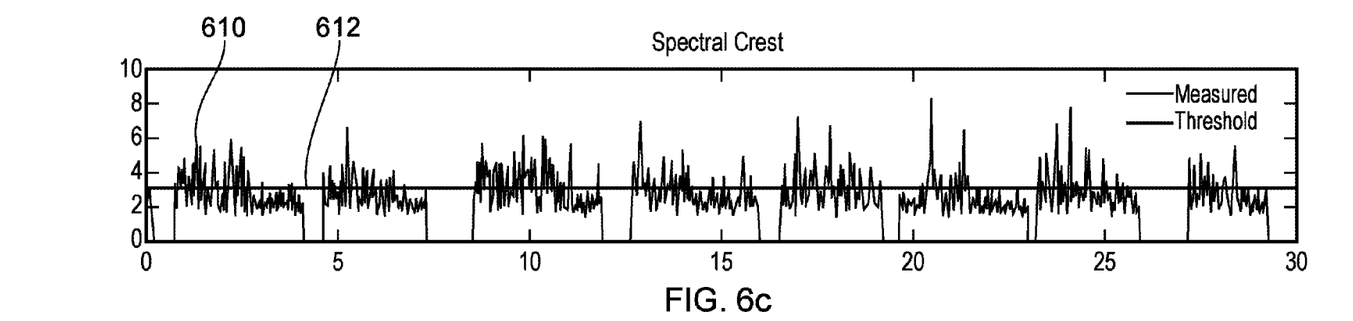

FIG. 6c illustrates the spectral crest 610 of the audio signal 600 as a function of time. A threshold level 612 for classifying the periods of speech 602 and not speech 604 is also shown in FIG. 6c.

Figure 6D:
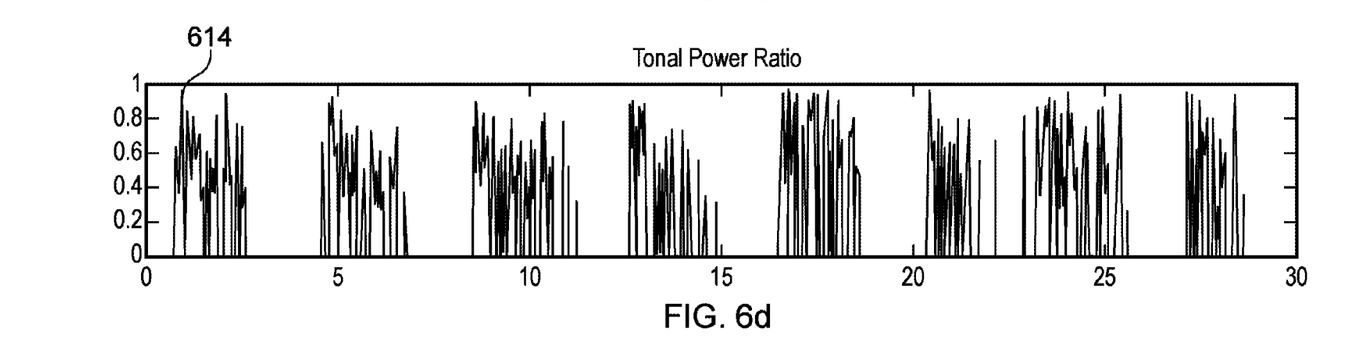

FIG. 6d illustrates the tonal power ratio 614 of the audio signal as a function of time.

As is apparent from FIGS. 6b to 6d, each of the features taken individually provides a reasonable estimate of whether the audio signal contained speech 602 or not speech 604 at a particular time. By combining these features, a robust classification scheme may be provided. For example, the software may classify an audio frame as a speech frame if more than one of the features meets a predetermined threshold. Such a classification may be referred to as a multi-boundary decision.

Two sets of thresholds may be used for the short-term energy and the tonal power ratio. The thresholds may be varied in order to adjust the sensitivity of the VAD with respect to the noise level estimate provided by the LPAM and a global tuneable threshold. For each new sub frame, the short-term energy value is compared with the sum of the global threshold with the noise level estimate. The objective is to have a self-adjustment of the algorithm according to the background noise conditions and the position of the user. Indeed, the speech level on the microphone is different depending on factors such as whether the user is close to or far from the device. The switch between the different set of thresholds is visible on the short-term energy threshold, especially when we look at time period when speech is absent. Alternatively, fixed thresholds with short-term features may be used.

Returning to FIG. 5, a VAD decision 526 is made by comparing the extracted features 524 with thresholds 528. Adaptation of thresholds 528 using the extracted features 524 is necessary in order to track time-varying changes in the acoustic environments. If a period of speech is incorrectly classified as a period of noise then the estimation of the thresholds will be corrupted. Such a corruption may affect classifications of subsequent frames 522 of the audio signal 506b. In some applications, such as some mobile applications, misclassification may be particularly important because energy is lost by triggering a voice recognition application, whereas missing elements of the speech results in the loss of voice recognition information. The threshold levels for the various features may be set in accordance with the requirements for a particular application. For example, in applications where the primary objective is to minimise power consumption then it may be preferable to potentially lose some useful signal in order to avoid wasting power and analysing quiet periods. Alternatively, in applications where the loss of useful information in the audio signal is not acceptable a trade-off may be made by analysing quiet periods.

Figure 7A:
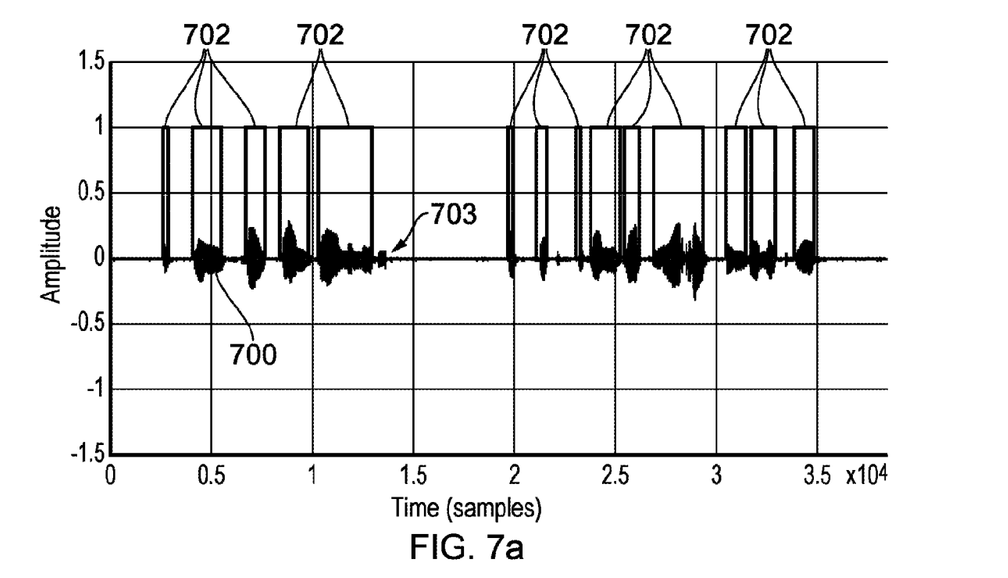
FIGS. 7a and 7b illustrate an audio signal categorised using different feature thresholds.

FIG. 7a illustrates an audio signal 700 against time together with an indication of periods that have been identified as speech 702a in which the thresholds for the features have been set such that unnecessary analysis time is minimised, at a cost that some useful speech 703 is lost.

Figure 7B:
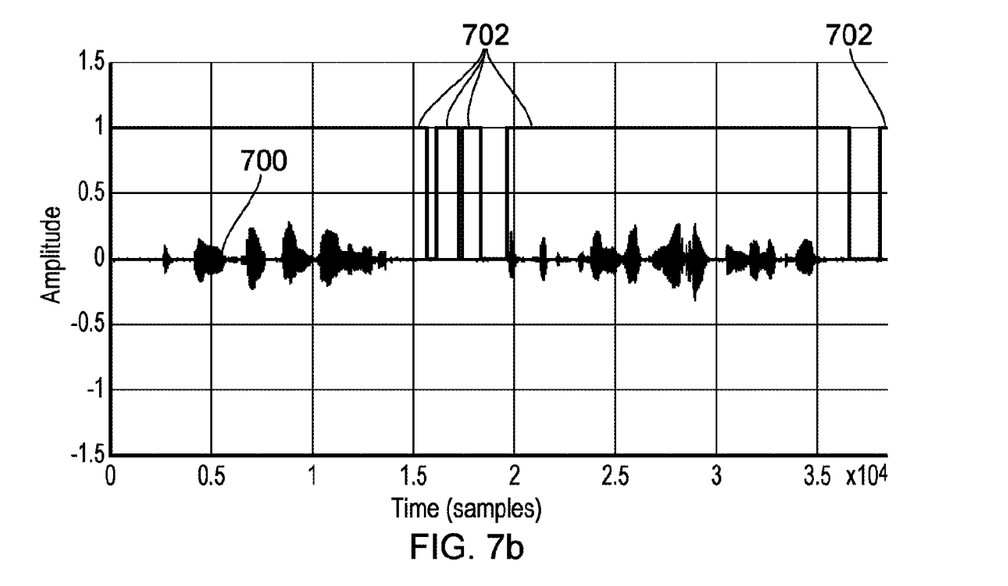

FIG. 7b illustrates an audio signal 700 against time together with an indication of periods that have been identified as speech 702b in which the thresholds for the features have been set such that no information is lost, at a cost of analysing quiet periods 704b.

Returning to FIG. 5, to ensure a smooth behaviour of the VAD, a frame based decision over 32 ms time frame is obtained by taking into account the history of past decisions and corrected by a release time control. Indeed, for each frame of 32 ms, we get two decisions coming from 16 ms signal analysis. Block 526 impacts the frame based decision over a 16 ms time frame. This corresponds to Multi-boundary decision part.

A VAD correction block 530 can modify the final decision outputted by the audio classifier based on the decision history and the release time. The last ten decisions may be stored in a buffer, which means that the last 160 ms are used to confirm the speech presence in the current frame. Once it has been confirmed, a release time counter triggers in order to ensure that the system will not suppress part of the useful speech.

Figure 8:
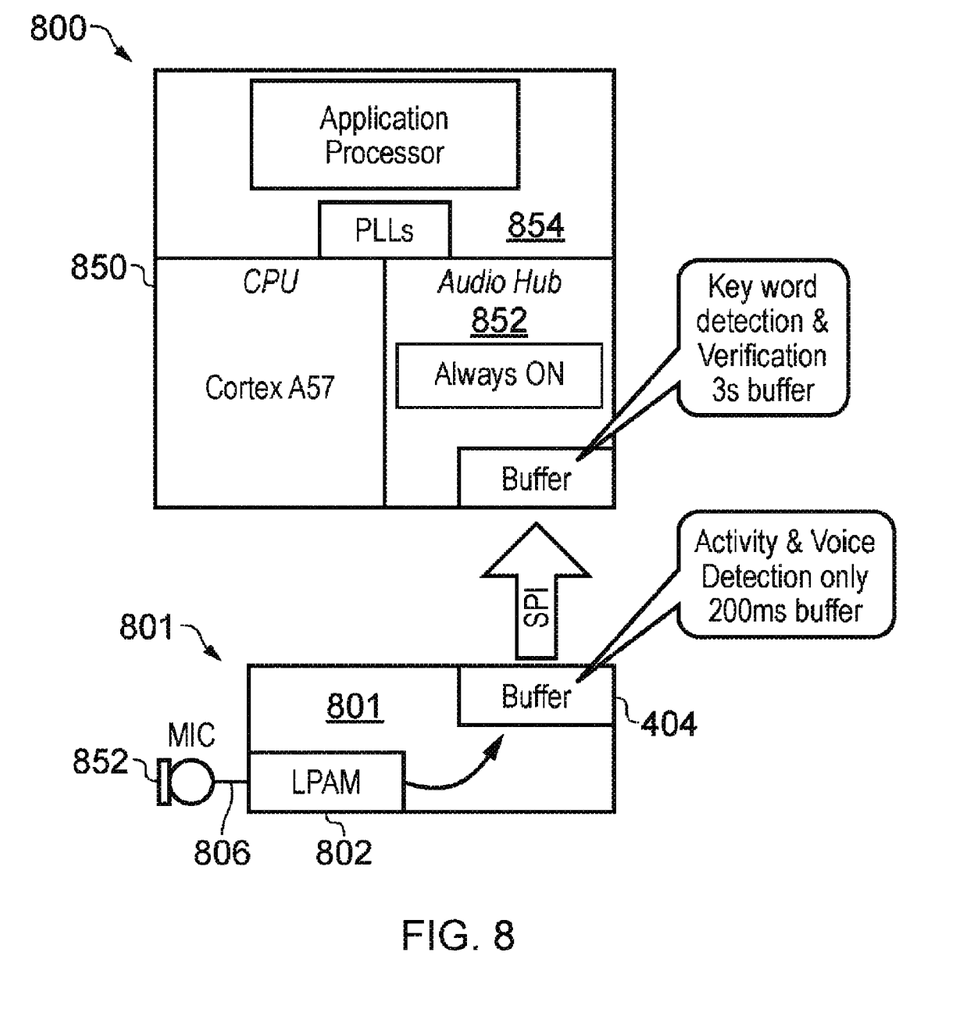
FIG. 8 shows a block diagram of an architecture for an audio recognition system.

FIG. 8 illustrates an example architecture for a voice recognition system 800. The voice recognition system 800 comprises a smart audio amplifier 801 and a multicore processor 850. The smart audio amplifier has a low power audio monitoring (LPAM) unit 802 which may be implemented in hardware and firmware and corresponds to the first processor and the first stage of the second processor described with reference to previous examples. The low power audio monitoring unit 802 receives an audio signal 806 from a microphone 852 and provides detected audio to a buffer 804 for buffering 200 ms samples. The 200 ms samples comprise detected audio/voice activity and are passed from the buffer 404 to the multicore processor 850 using a serial port interface, for example. The multicore processor may be provided with an ARM architecture. An example processor includes the Cortex A57. The multicore processor 850 has an audio hub 852 and an application processor 854. The audio hub provides always on keyword detection verification and comprises a 3 second buffer. The audio hub 850 to may provide the functionality of the second stage of the second processor described with reference to previous examples. As such, in this example, the first stage of the second processor is provided by a separate processing unit to the second stage of the second processor. The application processor 854 may be configured to run a voice or music recognition software.

Figure 9A:
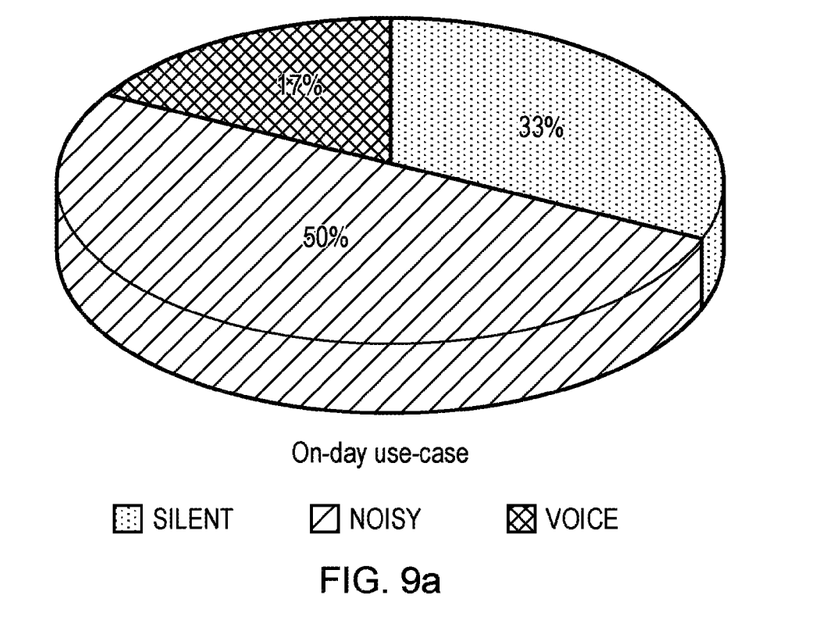
FIGS. 9a and 9b show charts illustrating the performance of the audio recognition system of FIG. 8.
Figure 9B:
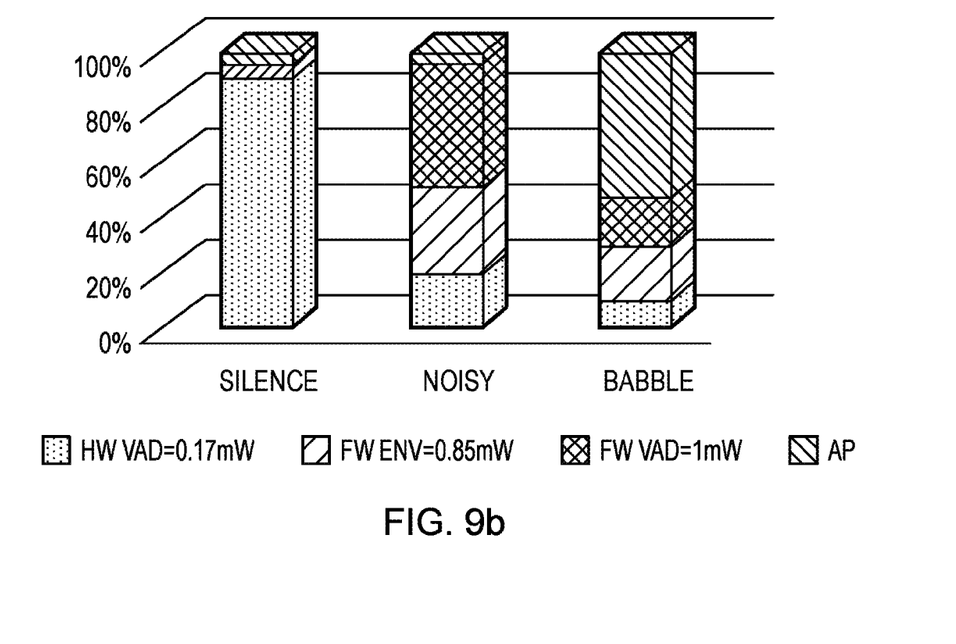

FIGS. 9a and 9b show charts illustrating the performance of the audio recognition system of FIG. 8. FIG. 9a shows a pie chart of the distribution of time in an example on-day use case for a mobile device comprising the audio recognition system. The device spends 50% of the day in a noise environment, 33% of the day in a silent environment and 17% of the day listening to a voice. FIG. 9b shows the proportion of the device energy consumption that is attributed to the hardwired logic of the first processor (power consumption of 0.14 mW), the first stage of the second processor which interprets firmware instructions (power consumption of 0.85 mW) and the second stage of the second processor (power consumption of 1 mW or more).

Figure 10:
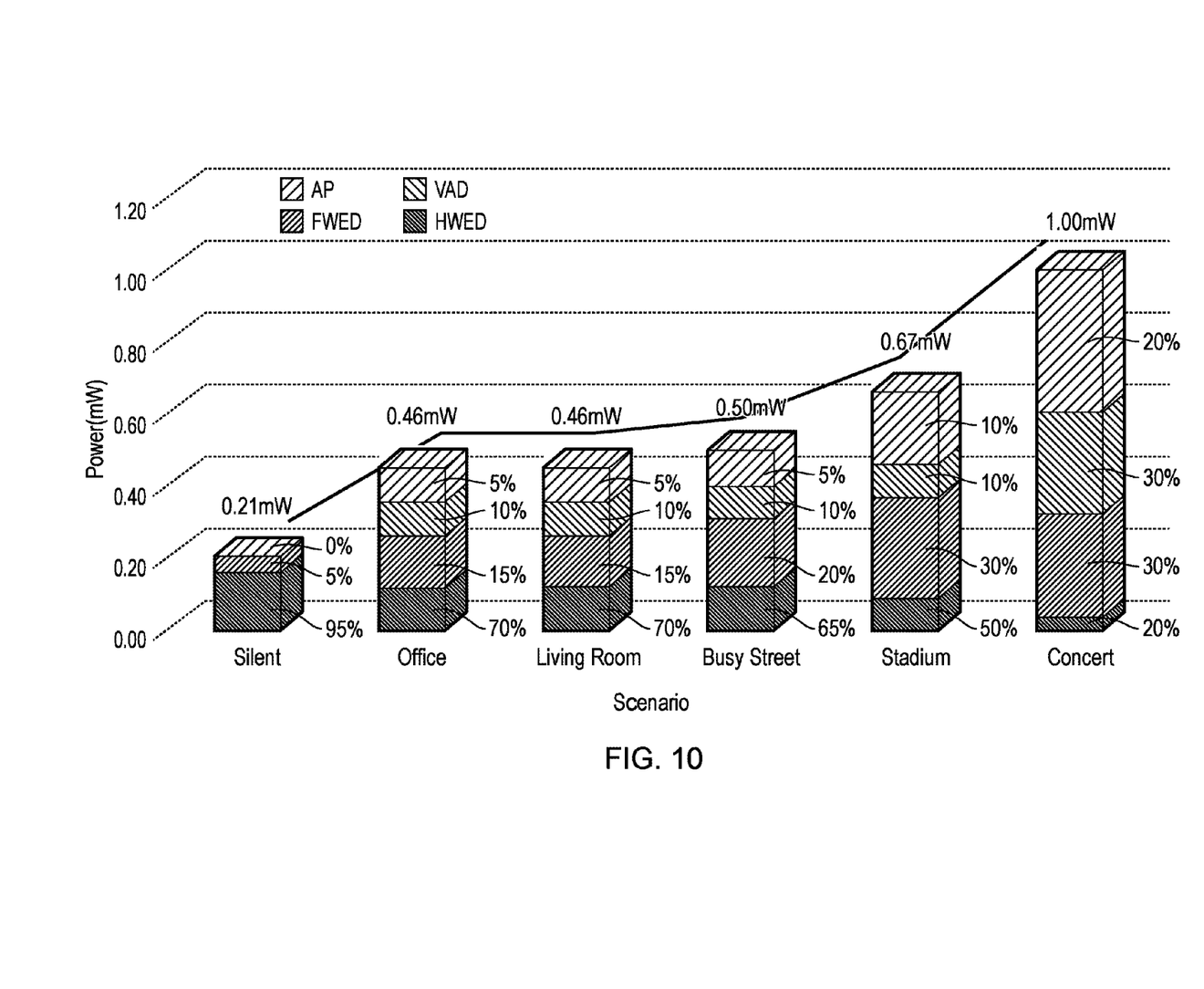
FIG. 10 shows a chart illustrating the performance of the audio recognition system of FIG. 8.

FIG. 10 also shows a chart illustrating the performance of the audio recognition system of FIG. 8 in various use conditions. The total power consumption, in milliwatts is provided for a variety of conditions: silent (0.21 mW), office (0.46 mW), living room (0.46 mW), busy street (0.50 mW), stadium (0.67 mW), concert (1.00 mW). The proportion of the total power consumption that is consumed by each process is shown for each condition. Moving away from the horizontal axis in FIG. 10, the blocks illustrating power consumption are arranged in the order of: the first processor (hardwired logic—HWED), a first stage of the second processor (firmware logic—FWED), the second stage of the second processor (software logic—VAD) and the voice recognition software (AP) running on the application processor. In quiet conditions, with a high signal-to-noise ratio, the majority of the power consumed is by the first processor but the overall amount of power consumed is low. In contrast, in noisy conditions with a low signal-to-noise ratio, a greater proportion of the power consumed is by subsequent stages, such as functions provided by the second processor or the voice recognition process, and the overall amount of power consumed is greater.

The voice recognition system may be configured to provide functionality such as:
voice activation, like 'OK GOOGLE™'
voice command which encompasses two technologies
Keyword based like 'CALL HOME', 'STOP MUSIC', etc.
Natural language based like 'CALL MY WIFE', 'SEND TEXT MESSAGE TO MY WIFE'S MOBILE THAT I WILL BE LATE'

In particular, the voice recognition system may be used to provide:
Voice wake-up, always-on voice trigger: the microphone is open and silently waiting for key-words (or useful speech) to be detected. Biometric authentication can be used, detection of emotion, detection of the language can then be performed. The proposed audio front-end continues to feed the algorithm running on an application processor until the user stop speaking.
Music sensor, 'always-on Shazam': One microphone is opened searching for repeated spectral and beat patterns. Once music or singer voice is detected, a web-application is launched for media-related data exchanges (music files, concert tickets, user profiling, etc.)
Meta-data contributor: Microphone signal is processed to extract information to be consolidated in a sensor hub with other sensors. In this case, the recognition engine is not only used to analyse speech signal but any relevant environment sound sources. In this case, the second stage of the second processor may not be required. Consequently, the wake-up signal for the recognition engine relies on a low power audio monitoring (LPAM) unit, such as that described with reference to FIG. 8, to detect energy variation of the background noise and report it to an application processor. As such, the first stage of a second processor may be considered to classify the audio signal by providing an energy level. The microphone signal filtered by the LPAM may then be processed by the application processor to get sound source direction, room size estimator, background noise level or to perform audio pattern recognition for context awareness. Use case examples include: after driving a vehicle the engine is stopped and the application processor is notified of the new background noise from its surroundings, such as a garage, crowed place or siren.

The invention claimed is:

1. An audio classifier comprising:
a first processor having hard-wired logic configured to receive an audio signal and detect audio activity from the audio signal, wherein the first processor is an analogue processor; and
a second processor having reconfigurable logic configured to classify the audio signal as a type of audio signal in response to the first processor detecting audio activity, wherein the second processor is a digital processor;
in which the second processor is a voice activity detector, in which the second processor is configured to classify the audio signal as either speech or not speech;
in which the second processor is configured to determine at least three features of the audio signal and classify the audio signal as either speech or not speech in accordance with the at least three features, in which the at least three features comprises:
short term energy;
tonal power ratio; and
spectral crest factor;
wherein the second processor is configured to compute the tonal power ratio and the crest factor using common computed quantities and is configured to classify the audio signal as speech only if each of the short term energy, the tonal power ratio, and the spectral crest factor exceeds a corresponding feature-specific predetermined threshold.

2. The audio classifier of claim 1 in which the second processor is configured to perform the classification in conjunction with software or firmware.

3. The audio classifier of claim 1 comprising an analogue-to-digital converter configured to digitize the analogue audio signal, in which the second processor is configured to classify a digitized audio signal.

4. The audio classifier of claim 1 in which the at least three features further comprises a zero crossing rate.

5. The audio classifier of claim 1 in which the second processor is configured to generate one or more metrics associated with the audio signal.

6. The audio classifier of claim 5 in which the metrics include an average background level of the audio signal over an interval of time.

7. The audio classifier of claim 1 in which the first processor is configured to determine an energy of the audio signal in order to detect audio activity.

8. The audio classifier of claim 1 in which the first processor is configured to operate on an analogue audio signal.

9. An audio recognition system comprising:
the audio classifier having;
a first processor having hard-wired logic configured to receive an audio signal and detect audio activity from the audio signal, wherein the first processor is an analogue processor; and
a second processor having reconfigurable logic configured to classify the audio signal as a type of audio signal in response to the first processor detecting audio activity, wherein the second processor is a digital processor;
in which the second processor is a voice activity detector, in which the second processor is configured to classify the audio signal as either speech or not speech;
in which the second processor is configured to determine at least three features of the audio signal and classify the audio signal as either speech or not speech in accordance with the at least three features, in which the at least three features comprises:
short term energy;
tonal power ratio; and
crest factor; and
wherein the second processor is configured to compute the tonal power ratio and the crest factor using common computed quantities and is configured to classify the audio signal as speech only if each of the short term energy, the tonal power ratio, and the spectral crest factor exceeds a corresponding feature-specific predetermined threshold;
an audio recognition unit configured to determine one or more audio segments from the audio signal in response to the second processor classifying the audio as a particular type of audio signal.

10. The audio recognition system of claim 9 in which the audio recognition system is a voice recognition system and the audio recognition unit is a voice recognition unit configured to determine one or more words from the audio signal in response to the second processor classifying the audio signal as a voice signal.

11. The audio recognition system of claim 9 in which the audio recognition system is a music recognition system and the audio recognition unit is a music recognition unit configured to recognize a piece of music from the audio signal in response to the second processor classifying the audio signal as music.

12. A mobile computing device comprising the voice recognition system of claim 9.

13. An audio classifier comprising:
a first processor having hard-wired logic configured to receive an audio signal and detect audio activity from the audio signal, wherein the first processor is an analogue processor; and
a second processor having reconfigurable logic configured to classify the audio signal as a type of audio signal in response to the first processor detecting audio activity, wherein the second processor is a digital processor;
in which the second processor is a voice activity detector, in which the second processor is configured to classify the audio signal as either speech or not speech;
in which the second processor is configured to determine at least three features for each frame of the audio signal and classify the audio signal as either speech or not speech in response to the at least three features, wherein the at least three features include short-term energy, spectral crest factor, and tonal power ratio; and
wherein the second processor is configured to compute the tonal power ratio and the crest factor using common computed quantities and is configured to classify the audio signal as speech only if each of the short term energy, the tonal power ratio, and the spectral crest factor exceeds a corresponding feature-specific predetermined threshold;
wherein the common computed quantity used by the second processor to compute the tonal power ratio and the crest factor comprises $M_t[n]$, where $M_t[n]$ is the magnitude of the Fourier transform at frame t and frequency bin n.

14. The audio classifier of claim 1 wherein the common computed quantity used by the second processor to compute the tonal power ratio and the crest factor comprises $M_t[n]$, where $M_t[n]$ is the magnitude of the Fourier transform at frame t and frequency bin n.

* * * * *